(12) United States Patent
Henry et al.

(10) Patent No.: US 7,827,390 B2
(45) Date of Patent: Nov. 2, 2010

(54) MICROPROCESSOR WITH PRIVATE MICROCODE RAM

(75) Inventors: G. Glenn Henry, Austin, TX (US);
Colin Eddy, Round Rock, TX (US);
Rodney E. Hooker, Austin, TX (US);
Terry Parks, Austin, TX (US)

(73) Assignee: VIA Technologies, Inc., Taipei (TW)

( * ) Notice: Subject to any disclaimer, the term of this patent is extended or adjusted under 35 U.S.C. 154(b) by 477 days.

(21) Appl. No.: 12/034,503

(22) Filed: Feb. 20, 2008

(65) Prior Publication Data

US 2008/0256336 A1 Oct. 16, 2008

Related U.S. Application Data

(60) Provisional application No. 60/910,982, filed on Apr. 10, 2007.

(51) Int. Cl.
*G06F 9/312* (2006.01)
(52) U.S. Cl. .................................................. 712/225
(58) Field of Classification Search ....................... None
See application file for complete search history.

(56) References Cited

U.S. PATENT DOCUMENTS

| | | | | |
|---|---|---|---|---|
| 5,642,491 A | * | 6/1997 | Rose et al. ..................... | 711/2 |
| 5,829,012 A | * | 10/1998 | Marlan et al. ................ | 711/102 |
| 5,870,601 A | * | 2/1999 | Getzlaff et al. .............. | 712/244 |
| 6,014,757 A | * | 1/2000 | Yoder et al. .................. | 714/15 |
| 6,081,888 A | * | 6/2000 | Bell et al. .................... | 712/248 |
| 6,154,818 A | * | 11/2000 | Christie ....................... | 711/163 |
| 6,654,875 B1 | * | 11/2003 | Hartnett et al. ............. | 712/211 |
| 6,751,737 B1 | * | 6/2004 | Russell et al. ................ | 726/34 |
| 7,165,084 B2 | * | 1/2007 | Crispin et al. ............... | 708/250 |
| 2005/0289541 A1 | * | 12/2005 | Mondal et al. ................ | 718/1 |
| 2006/0136608 A1 | * | 6/2006 | Gilbert et al. ................. | 710/3 |

OTHER PUBLICATIONS

Case, Brian, Intel Reveals Pentium Implementation Details Architectural Enhancements Remain Shrouded by NDA, Mar. 1993, Microdesign Resources, vol. 7, No. 4, 9 pages.*
*IA-32 Intel® Architecture Software Developer's Manual.* vol. 3B: *System Programming Guide, Part 2.* Jun. 2006. pp. 20-22 & 20-23.
*IA-32 Intel® Architecture Software Developer's Manual.* vol. 3: *System Programming Guide.* 2003. pp. 13-5 thru 13-7.
*IA-32 Intel Architecture Software Developer's Manual.* vol. 2: *Instruction Set Reference.* 2003. pp. 3-766 thru 3-772.

* cited by examiner

*Primary Examiner*—Eric Coleman
(74) *Attorney, Agent, or Firm*—E. Alan Davis; James W. Huffman (57) ABSTRACT

A microprocessor includes a private RAM (PRAM), for use by microcode, which is non-user-accessible and within its own distinct address space from the system memory address space. The PRAM is denser and slower than user-accessible registers of the microprocessor macroarchitecture, thereby enabling it to provide significantly more storage for microcode. The microinstruction set includes a microinstruction for loading data from the PRAM into the user-accessible registers, and a microinstruction for storing data from user-accessible registers to the PRAM. The microcode may also use the two microinstructions to load/store between the PRAM and non-user-accessible registers of the microarchitecture. Examples of PRAM uses include: computational temporary storage area; storage of x86 VMX VMCS in response to VMREAD and VMWRITE macroinstructions; instantiation of non-user-accessible storage, such as the x86 SMBASE register; and instantiation of x86 MSRs that tolerate the additional access latency of the PRAM, such as the IA32_SYSENTER_CS MSR.

29 Claims, 4 Drawing Sheets

Separate Memory and PRAM Address Spaces

Fig. 11

Fig. 3 loadPRAM microinstruction execution

Fig. 4 storePRAM microinstruction execution

Fig. 5

VMWRITE macroinstruction execution

Fig. 6

VMREAD macroinstruction execution

Fig. 7
WRMSR IA32_SYSENTER_CS macroinstruction execution

Fig. 8
RDMSR IA32_SYSENTER_CS macroinstruction execution

Fig. 9
RSM macroinstruction execution

Fig. 10
SMI operation

MICROPROCESSOR WITH PRIVATE MICROCODE RAM

CROSS REFERENCE TO RELATED APPLICATIONS

This application claims priority to U.S. Provisional Application No. 60/910,982, filed Apr. 10, 2007 which is hereby incorporated by reference in its entirety for all purposes.

BACKGROUND OF THE INVENTION

Field of the Invention

The present invention relates in general to the field of microprocessors with microcode, and particularly to temporary variable storage for the microcode.

Microprocessors include an instruction set that is part of the instruction set architecture (ISA) of the microprocessor, also referred to herein as the macroarchitecture of the microprocessor. The instruction set defines the set of legal instructions that the microprocessor will execute. A programmer—also referred to herein as a user—uses the instructions of the instruction set to write a program to be executed by the microprocessor. The programmer may be an application programmer writing application programs or a system programmer writing operating system or executive software. The ISA also includes the resources, such as registers, that instructions of the instruction set are allowed to access. Examples of a popular ISA are the Intel® IA-32 and IA-64 ISA, also commonly referred to as the x86 architecture, which includes an instruction set and set of user-accessible registers including the general purpose registers, segment registers, stack and base pointer registers, and so forth, which are well known in the art of computer programming.

Many modern microprocessors include a microarchitecture with resources that are not directly accessible by the user writing programs to the microprocessor ISA. The microarchitecture includes its own microinstruction set of supported microinstructions, which is different from the user-accessible instruction set of the ISA. The user-accessible instructions of the ISA instruction set are also sometimes referred to as macroinstructions to distinguish them from the microinstructions of the microinstruction set. The microinstructions are simpler than the macroinstructions and control the hardware of the microprocessor more directly. The microprocessor designers write microcode, comprising microinstructions of the microarchitecture microinstruction set, which is executed within the microarchitecture of the microprocessor. Typically, the microprocessor includes an instruction translator that translates the user program macroinstructions into one or more microinstructions of the microinstruction set that are then dispatched to execution units of the microprocessor for execution. If the macroinstruction is particularly complex, the translator may invoke a routine in the microcode consisting of multiple microinstructions to perform the ISA instruction. Contemporary x86 architecture ISA microprocessors, for example, employ a reduced instruction set computer (RISC) microarchitecture that includes a RISC-style instruction set that is significantly simpler than the IA-32 macroinstruction set.

Additionally, the microarchitecture typically includes resources in addition to the user-accessible ISA resources, such as additional registers used exclusively by the microcode that are non-user-accessible. For example, the number of user-accessible registers of the IA-32 ISA is relatively small, particularly compared to many RISC architecture microprocessors, thereby motivating the instantiation of non-user-accessible registers for use by RISC-style microinstructions.

Recent innovations in microprocessor ISA's have generated an increased demand for the amount of additional registers needed by the microarchitecture to implement the new features. However, unfortunately, the amount of chip real estate consumed by a large amount of additional registers may be prohibitive. Furthermore, there are reasons the microcode should not use system memory for the additional storage space, including large system memory access latency and the fact that it is typically the operating system, rather than microcode, which allocates and manages system memory. Therefore, what is needed is a way of providing additional storage for use by microcode that is relatively fast and that consumes less chip area than registers.

BRIEF SUMMARY OF INVENTION

In one aspect, the present invention provides a microprocessor. The microprocessor includes a user-accessible register set. The microprocessor also includes a random access memory (RAM), within a non-user-accessible address space of the microprocessor. The RAM is denser than the user-accessible register set and is slower to access than the user-accessible register set. The microprocessor also includes microcode, comprising a plurality of microinstructions of a microinstruction set of the microprocessor. The microinstruction set includes a first microinstruction, executable for storing data from the user-accessible register set to the RAM, and a second microinstruction, executable for loading data from the RAM to the user-accessible register set.

In one aspect, the present invention provides a method for efficiently storing data within a microprocessor. The method includes executing a first microcode instruction, by storing data from a user-accessible register set of the microprocessor to a random access memory (RAM) of the microprocessor. The RAM is within a non-user-accessible address space of the microprocessor. The RAM is denser than the user-accessible register set and is slower to access than the user-accessible register set. The method also includes executing a second microcode instruction, by loading data from the RAM to the user-accessible register set. The first and second microinstructions are two of a plurality of microinstructions of a microinstruction set of the microprocessor.

In another aspect, the present invention provides a computer program product for use with a computing device, the computer program product including a computer usable storage medium, having computer readable program code embodied in the medium, for providing a microprocessor. The computer readable program code includes first program code for providing a user-accessible register set. The computer readable program code also includes second program code for providing a random access memory (RAM), within a non-user-accessible address space of the microprocessor. The RAM is denser than the user-accessible register set and is slower to access than the user-accessible register set. The computer readable program code also includes third program code for providing microcode, comprising a plurality of microinstructions of a microinstruction set of the microprocessor. The microinstruction set includes a first microinstruction, executable for storing data from the user-accessible register set to the RAM, and a second microinstruction, executable for loading data from the RAM to the user-accessible register set.

In another aspect, the present invention provides a method for providing a microprocessor. The method includes providing computer-readable program code describing the microprocessor. The program code includes first program code for providing a user-accessible register set. The program code also includes second program code for providing a random access memory (RAM), within a non-user-accessible address space of the microprocessor. The RAM is denser than the user-accessible register set and is slower to access than the user-accessible register set. The program code also includes third program code for providing microcode, comprising a plurality of microinstructions of a microinstruction set of the microprocessor. The microinstruction set includes a first microinstruction, executable for storing data from the user-accessible register set to the RAM, and a second microinstruction, executable for loading data from the RAM to the user-accessible register set. The method also includes transmitting the computer-readable program code as a computer data signal on a network.

DETAILED DESCRIPTION OF THE INVENTION

Figure 1:
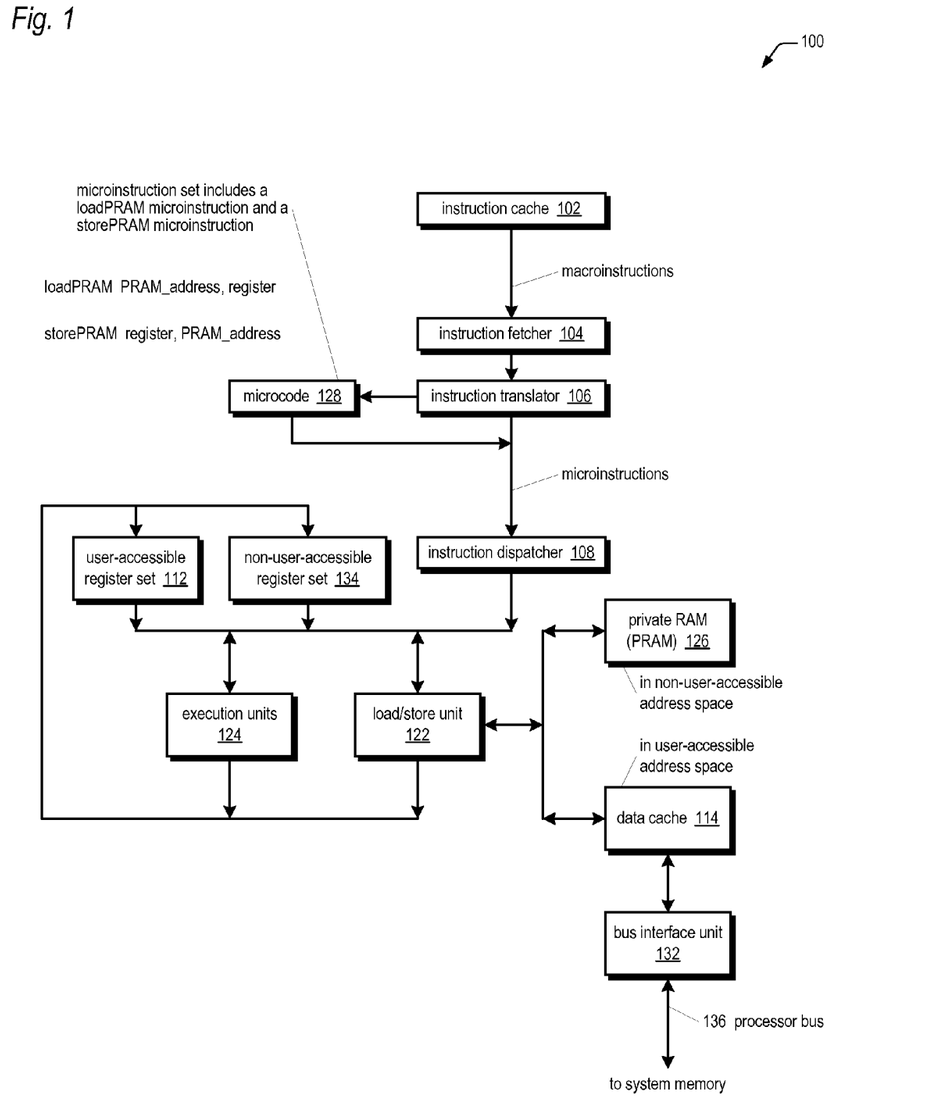
FIG. 1 is a bock diagram illustrating a pipelined microprocessor including a private random access memory (PRAM) according to the present invention.

Referring now to FIG. 1, a bock diagram illustrating a pipelined microprocessor 100 including a private random access memory (PRAM) 126 according to the present invention is shown. In one embodiment, the elements of the microprocessor 100 of FIG. 1, including the PRAM 126, are all integrated onto a single semiconductor substrate. The PRAM 126 is referred to as a private RAM because it is not accessible by user code macroinstructions, but is only accessible by the microprocessor 100 itself, such as via microcode 128 of the microprocessor 100. Furthermore, the microprocessor 100 includes distinct microinstructions in its microinstruction set for accessing the PRAM 126, as discussed below.

The microprocessor 100 includes an instruction cache 102 that caches user program macroinstructions fetched from a system memory coupled to the microprocessor 100. The microprocessor 100 also includes an instruction fetcher 104, coupled to the instruction cache 102, that fetches macroinstructions from the instruction cache 102 and the system memory. The microprocessor 100 also includes an instruction translator 106, coupled to the instruction fetcher 104, which decodes the fetched macroinstructions of the macroinstruction set of the microprocessor 100 and translates the fetched macroinstructions into microinstructions of the microinstruction set of the microprocessor 100. The microinstructions may include loadPRAM and storePRAM microinstructions according to the present invention. The microinstructions may also include normal memory load/store microinstructions.

The microprocessor 100 also includes microcode 128. The microcode 128 comprises a plurality of microinstructions of the microinstruction set of the microprocessor 100. Portions of the microcode 128 include routines, or sequences, of microinstructions to implement the execution of a macroinstruction or to handle exception conditions. In particular, when the instruction translator 106 decodes certain of the macroinstructions, such as relatively complex macroinstructions, the instruction translator 106 transfers control to the appropriate routine in the microcode 128, rather than directly generating translated microinstructions.

In particular, the microinstruction set includes a loadPRAM microinstruction and a storePRAM microinstruction, which as shown in FIG. 1 have the respective formats:

loadPRAM PRAM_address, register
storePRAM register, PRAM_address

The PRAM_address operand of the loadPRAM microinstruction specifies a source location in the PRAM 126 from which data is loaded into a destination register specified by the register operand of the loadPRAM microinstruction. The PRAM_address operand of the storePRAM microinstruction specifies a destination location in the PRAM 126 into which data is stored from a source register specified by the register operand of the storePRAM microinstruction. The specified register may be one of the registers in the user-accessible register set 112 or one of the registers in the non-user-accessible register set 134, which are described below.

An instruction dispatcher 108, coupled to the instruction translator 106, dispatches the microinstructions provided by the instruction translator 106 or microcode 128 to one of multiple functional units coupled to the instruction dispatcher 108. The functional units include a load/store unit 122 and one or more execution units 124 such as integer units, floating-point units, and single-instruction-multiple-data (SIMD) units. In particular, the instruction dispatcher 108 dispatches loadPRAM and storePRAM microinstructions of the present invention to the load/store unit 122.

The microprocessor 100 also includes a user-accessible register file 112 of the macroarchitecture that supplies instruction operands to the functional units and receives instruction results from the functional units. The microprocessor 100 also includes a non-user-accessible register file 134 of the microarchitecture that supplies instruction operands to the functional units and receives instruction results from the functional units. The non-user-accessible register file 134 is only accessible by microinstructions and is not accessible by the user macroinstructions. The non-user-accessible register file 134 is used by the microcode 128, for example, as temporary storage to perform computations. The non-user-accessible register file 134 registers may be used by the microcode 128 rather than the PRAM 126 for certain purposes that require a shorter access latency than the PRAM 126 and for which a smaller amount of storage may suffice.

The microprocessor 100 also includes a data cache 114, coupled to the load/store unit 122, which caches data from the system memory. The data cache 114 is user-accessible, that is, the data cache 114 is within the system memory address space of the microprocessor 100, which is accessible by user macroinstructions. A bus interface unit 132 is coupled to the data cache 114. The bus interface unit 132 is coupled to a processor bus 136 which is coupled to access the system memory. The bus interface unit 132 generates transactions on the processor bus 136 to transfer data between the microprocessor 100 and the system memory, such as when a memory address of a load or store microinstruction (i.e., a normal memory load or store microinstruction, as opposed to a loadPRAM or storePRAM microinstruction) misses in the data cache 114 which requires the missing cache line to be fetched from system memory into the data cache 114, or when a cache line is written-back or otherwise flushed from the data cache 114 to system memory.

Figure 2:
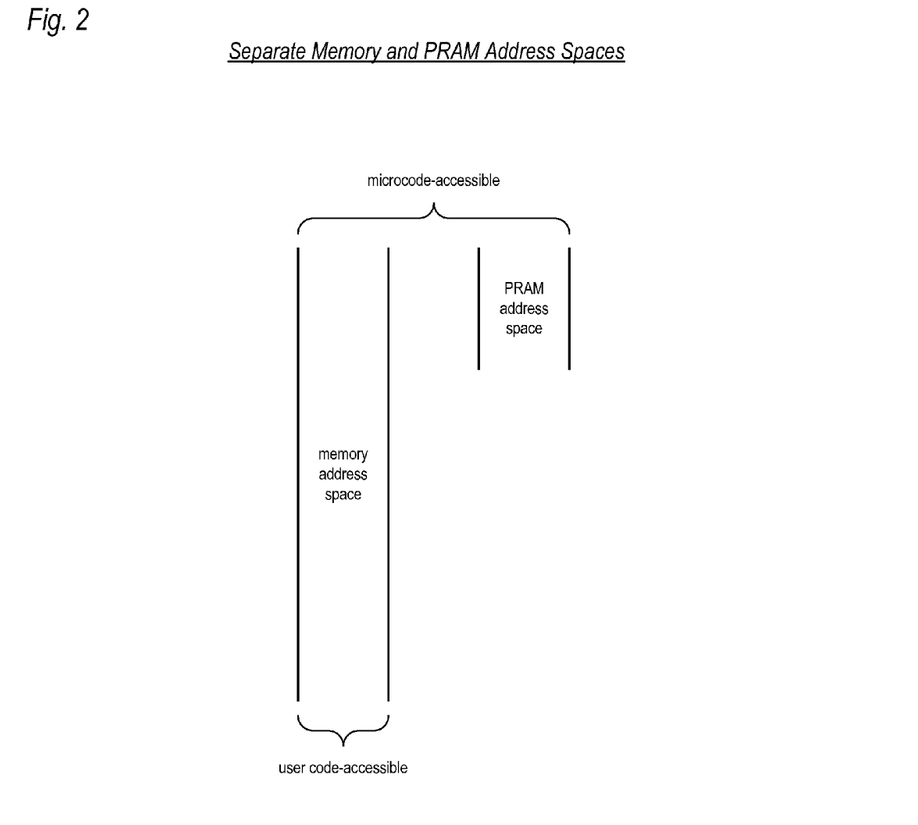
FIG. 2 is a block diagram illustrating distinct system memory and PRAM address spaces according to the present invention.

The PRAM 126 is coupled to the load/store unit 122. The PRAM 126 resides in its own non-user-accessible PRAM address space of the microprocessor 100 that is separate from the memory address space of the microprocessor 100, as shown in FIG. 2. That is, the PRAM 126 is not accessible by user code macroinstructions, but is only accessible by the microprocessor 100 itself, such as via microcode 128 or other internal hardware of the microprocessor 100. In contrast, the data cache 114 and system memory reside in the memory address space of the microprocessor 100 which is accessible by both user macroinstructions and by microcode 128, as shown in FIG. 2. The load/store unit 122 reads from and writes to the PRAM 126 in response to loadPRAM and storePRAM microinstructions, respectively, received from the instruction dispatcher 108.

In one embodiment, the PRAM 126 comprises 4 KB of storage. However, other embodiments are contemplated in which the PRAM 126 may be larger or smaller than 4 KB. Advantageously, the PRAM 126 is denser than the user-accessible register set 112 and the non-user-accessible register set 134. That is, the amount of data that may be stored in the PRAM 126 per unit area is greater than the amount of data that may be stored in the user-accessible register set 112 and the non-user-accessible register set 134 per unit area. This enables the PRAM 126 to include a large amount of storage locations relative to the user-accessible register set 112 and the non-user-accessible register set 134. In one embodiment, the PRAM 126 is at least twice as dense as the user-accessible register set 112 and the non-user-accessible register set 134. In one embodiment, the PRAM 126 is denser than the user-accessible register set 112 and the non-user-accessible register set 134 because it comprises custom static RAM bit cells that do not conform to the design rules of the particular fabrication technology used to fabricate the microprocessor 100 integrated circuit, whereas the user-accessible register set 112 and the non-user-accessible register set 134 comprise bit cells that conform to the fabrication technology design rules. In one embodiment, the PRAM 126 is constructed from the same SRAM bit cells as the data cache 114. In contrast, the PRAM 126 is slower to access than the user-accessible register set 112 and the non-user-accessible register set 134. The PRAM 126 may be slower to access than the user-accessible register set 112 and the non-user-accessible register set 134 for one or more of the following reasons: (1) there are more addressable locations in the PRAM 126 than there are addressable registers in the user-accessible register set 112 and the non-user-accessible register set 134, consequently the address decoding circuitry of the PRAM 126 has a longer delay than the user-accessible register set 112 and the non-user-accessible register set 134 address decoding circuitry; (2) the PRAM 126 bit cell line driver circuitry is weaker than the user-accessible register set 112 and the non-user-accessible register set 134 line driver circuitry; and (3) the load on the lines of the PRAM 126 is greater than the load on the lines of the user-accessible register set 112 and the non-user-accessible register set 134 due to the larger number of PRAM 126 bit cells. In one embodiment, the PRAM 126 requires four clock cycles to access, whereas the user-accessible register set 112 and the non-user-accessible register set 134 require a single clock cycle to access.

The microprocessor 100 also includes logic for detecting system memory load/store collisions. The logic forwards colliding load/store data to the appropriate stage of the microprocessor 100 to facilitate increased instruction per second rate. In one embodiment, the microprocessor 100 is an out-of-order execution microprocessor. The logic also enforces proper execution order of colliding load/stores. Advantageously, the logic is also used to detect PRAM 126 load/store collisions, to forward colliding PRAM 126 load/store data, and to enforce proper execution order of colliding PRAM 126 load/stores. However, because the PRAM 126 occupies a different address space than the system memory, the logic does not detect collisions between system memory load/stores and PRAM 126 load/stores. Thus, advantageously, a significant amount of the microprocessor 100 logic and data paths employed to execute memory load/store instructions is re-used by the microprocessor 100 to execute the loadPRAM and storePRAM microinstructions of the present invention.

In one embodiment, the load/store unit 122 does not translate the address specified by the loadPRAM and storePRAM microinstructions. That is, unlike normal load and store microinstructions, which specify a virtual address that is translated into a physical address via the address translation mechanism of the microprocessor 100 such as a memory paging unit, the address specified by the loadPRAM and storePRAM microinstructions is a physical address used to access the PRAM 126. In one embodiment, the PRAM_address operand is specified as a constant in the loadPRAM storePRAM instruction. In another embodiment, the programmer may employ addressing modes to specify the PRAM_address operand of the loadPRAM and storePRAM microinstructions similar to those employed in load/store memory microinstructions. That is, the address generation logic of the microprocessor 100 used to generate normal load/store microinstruction memory addresses may also be used to generate PRAM 126 addresses. In one embodiment, the loadPRAM and storePRAM instructions may specify up to three different operands that are added to generate the PRAM_address, namely, two fields that specify two respective registers storing operands and a constant displacement field. For example, the programmer may employ a base address stored in a register and increment an address offset value stored in a register to sequentially access PRAM 126 locations via loadPRAM and storePRAM microinstructions. The load/store unit 122 recognizes that the address operand of the loadPRAM and storePRAM microinstructions specifies a location only in the PRAM 126, not an address in the memory address space. Consequently, the load/store unit 122 does not request the bus interface unit 132 to generate transactions on the processor bus 136 in response to PRAM 126 accesses generated by loadPRAM and storePRAM microinstructions. Additionally, the PRAM 126 address space is non-cached.

Figure 3:
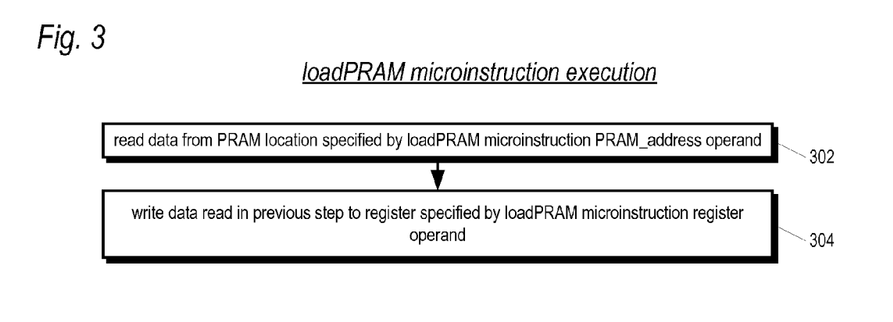
FIG. 3 is a flowchart illustrating execution of a loadPRAM microinstruction according to the present invention.

Referring now to FIG. 3, a flowchart illustrating execution of a loadPRAM microinstruction according to the present invention is shown. Flow begins at block 302.

At block 302, the load/store unit 122 receives a loadPRAM microinstruction and responsively reads data from a location in PRAM 126 specified by the PRAM_address operand. As stated above, the address of the location in the PRAM 126 may be generated by address generation logic according to an addressing mode specified in the loadPRAM microinstruction. Flow proceeds to block 304.

At block 304, the load/store unit 122 writes the data read at block 302 to the register specified by the loadPRAM microinstruction register operand. As discussed above, the register is a register of the user-accessible register set 112 or the non-user-accessible register set 134. Flow ends at block 304.

Figure 4:
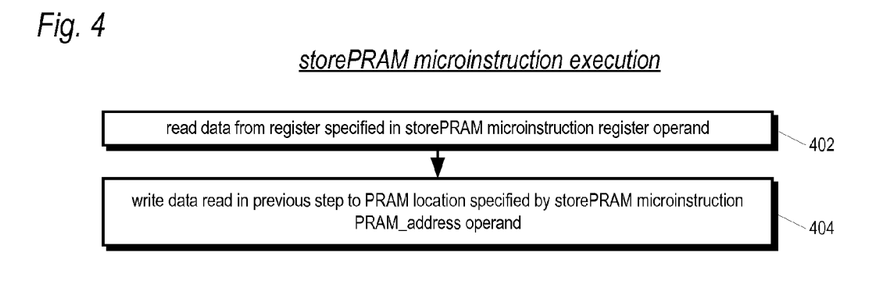
FIG. 4 is a flowchart illustrating execution of a storePRAM microinstruction according to the present invention.

Referring now to FIG. 4, a flowchart illustrating execution of a storePRAM microinstruction according to the present invention is shown. Flow begins at block 402.

At block 402, the load/store unit 122 receives a storePRAM microinstruction and responsively reads data from a register specified by the storePRAM microinstruction register operand. Flow proceeds to block 304.

At block 404, the load/store unit 122 writes the data read at block 402 to the location in PRAM 126 specified by the PRAM_address operand. Flow ends at block 404.

In one embodiment, the ISA of the microprocessor 100 substantially conforms to the IA-32 or IA-64 ISA. In particular, the user-accessible register set 112 substantially conforms to the IA-32 or IA-64 user-accessible register set, and the microprocessor 100 macroinstruction set substantially conforms to the IA-32/64 macroinstruction set. In these embodiments, the PRAM 126 may be used for various purposes including, but not limited to, the following. The PRAM 126 may be used to store one or more virtual-machine extensions (VMX) virtual machine control structures (VMCS), as described below with respect to FIGS. 5 and 6. In one embodiment, the microprocessor 100 stores a portion or all of the four most recently used VMCS in the PRAM 126. Additionally, locations of the PRAM 126 may be used to instantiate certain IA-32/64 model specific registers (MSR). For example, the IA32_SYSENTER_CS Model Specific Register (MSR) may be instantiated in the PRAM 126, as described below with respect to FIGS. 7 and 8. Still further, the PRAM 126 may be used to store system management interrupt (SMI)-related values. For example, the SMI base address (SMBASE) value may be stored in the PRAM 126, as described below with respect to FIGS. 9 and 10.

Figure 5:
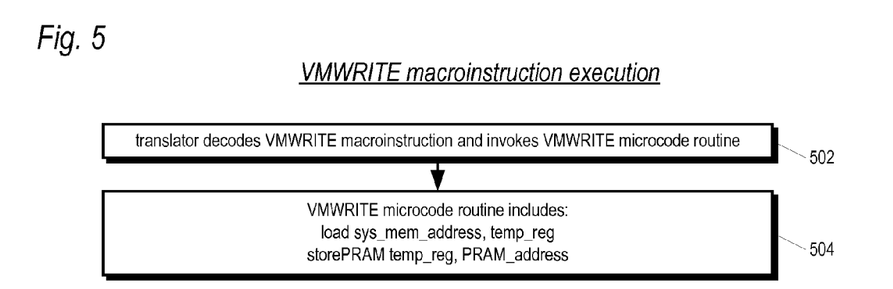
FIG. 5 is a flowchart illustrating execution by the microprocessor of FIG. 1 of a VMWRITE macroinstruction according to the present invention.

Referring now to FIG. 5, a flowchart illustrating execution by the microprocessor 100 of FIG. 1 of a VMWRITE macroinstruction according to the present invention is shown. Flow begins at block 502.

At block 502, the instruction translator 106 decodes a VMX VMWRITE macroinstruction and transfers control to the microcode 128 routine associated with the VMWRITE. Flow proceeds to block 504.

At block 504, the VMWRITE microcode 128 routine executes, which includes a load sys_mem_address, temp_reg microinstruction followed by a storePRAM temp_reg, PRAM_address microinstruction. The load sys_mem_address, temp_reg microinstruction reads the data from the system memory address that contains the VMCS field specified by the VMWRITE macroinstruction and writes the data to a temporary register of the non-user-accessible register set 134. The storePRAM temp_reg, PRAM_address microinstruction reads the data from the temporary register and writes it to the location in the PRAM 126 allocated for storing the VMCS field specified by the VMWRITE macroinstruction. In one embodiment, the microprocessor 100 allocates a number of storage locations of the PRAM 126 for a VMCS in response to a VMX VMPTRLD macroinstruction. Flow ends at block 504.

Figure 6:
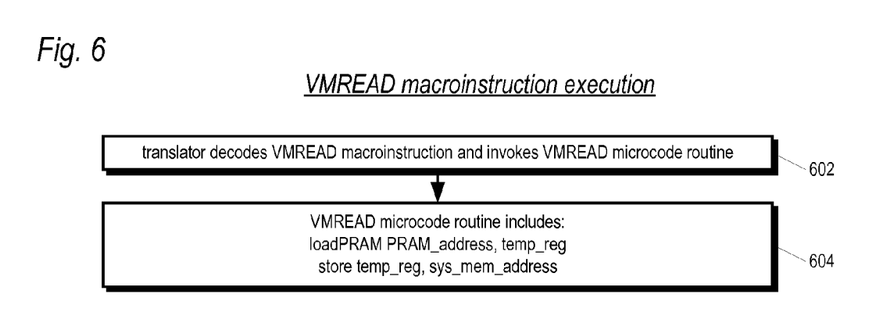
FIG. 6 is a flowchart illustrating execution by the microprocessor of FIG. 1 of a VMREAD macroinstruction according to the present invention.

Referring now to FIG. 6, a flowchart illustrating execution by the microprocessor 100 of FIG. 1 of a VMREAD macroinstruction according to the present invention is shown. Flow begins at block 602.

At block 602, the instruction translator 106 decodes a VMX VMREAD macroinstruction and transfers control to the microcode 128 routine associated with the VMREAD. Flow proceeds to block 604.

At block 604, the VMREAD microcode 128 routine executes, which includes a loadPRAM PRAM_address, temp_reg microinstruction followed by a store temp_reg, sys_mem_address microinstruction. The loadPRAM PRAM_address, temp_reg microinstruction reads the data from the PRAM 126 location address that contains the VMCS field specified by the VMREAD macroinstruction and writes the data to a temporary register of the non-user-accessible register set 134. The store temp_reg, sys_mem_address microinstruction reads the data from the temporary register and writes it to the location in system memory specified by the VMREAD macroinstruction. Flow ends at block 604.

FIGS. 5 and 6 describe operation of a VMWRITE and VMREAD macroinstruction that are associated with storing in PRAM 126 a VMCS for which system memory storage is allocated and for which the macroarchitecture does not mandate storage within the microprocessor 100, thereby facilitating faster access to the VMCS from PRAM 126 than from system memory. However, the invention is not limited to storing a VMCS in the PRAM 126. Rather, the PRAM 126 may be employed to store other data structures for which fast access relative to system memory is advantageous but for which the macroarchitecture does not specify storage within the microprocessor 100.

Figure 7:
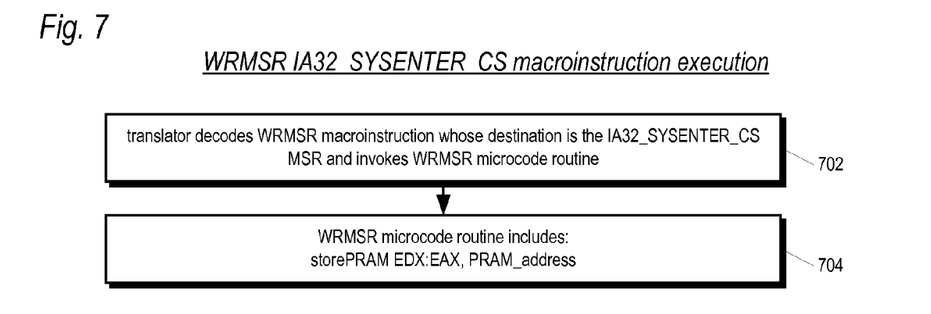
FIG. 7 is a flowchart illustrating execution by the microprocessor of FIG. 1 of an x86 architecture WRMSR macroinstruction according to the present invention.

Referring now to FIG. 7, a flowchart illustrating execution by the microprocessor 100 of FIG. 1 of an x86 architecture WRMSR macroinstruction according to the present invention is shown. Flow begins at block 702.

At block 702, the instruction translator 106 decodes a WRMSR macroinstruction that specifies the IA32_SYSENTER_CS MSR and transfers control to the microcode 128 routine associated with the WRMSR. Prior to the WRMSR macroinstruction, the user program includes one or more instructions for loading the ECX register with a value specifying the IA32_SYSENTER_CS MSR and loading the EDX:EAX registers with the value to be written to the MSR. Flow proceeds to block 704.

At block 704, the WRMSR microcode 128 routine executes, which includes a storePRAM EDX:EAX, PRAM_address microinstruction. The storePRAM EDX:EAX, PRAM_address microinstruction reads the data from the concatenated EDX:EAX registers and writes the data to the location in the PRAM 126 allocated for instantiating the IA32_SYSENTER_CS MSR. In one embodiment, the WRMSR microcode 128 routine loads a base register with a value specifying a global base address in the PRAM 126 for storing MSR values and the ECX value is used as an offset from the base address to form the physical PRAM 126 address. Flow ends at block 704.

Figure 8:
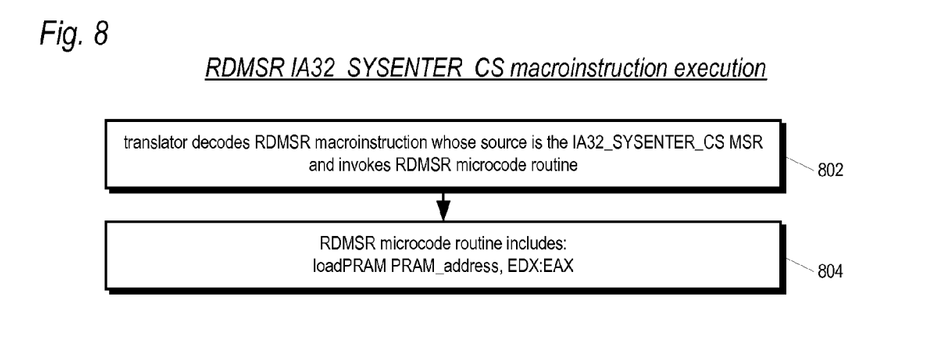
FIG. 8 is a flowchart illustrating execution by the microprocessor of FIG. 1 of an x86 architecture RDMSR macroinstruction according to the present invention.

Referring now to FIG. 8, a flowchart illustrating execution by the microprocessor 100 of FIG. 1 of an x86 architecture RDMSR macroinstruction according to the present invention is shown. Flow begins at block 802.

At block 802, the instruction translator 106 decodes a RDMSR macroinstruction that specifies the IA32_SYSENTER_CS MSR and transfers control to the microcode 128 routine associated with the RDMSR. Prior to the RDMSR macroinstruction, the user program includes one or more instructions for loading the ECX register with a value specifying the IA32_SYSENTER_CS MSR. Flow proceeds to block 804.

At block 804, the RDMSR microcode 128 routine executes, which includes a loadPRAM PRAM_address, EDX:EAX microinstruction. The loadPRAM PRAM_address, EDX:EAX microinstruction reads the data from the location in the PRAM 126 allocated for instantiating the IA32_SYSENTER_CS MSR and writes the data to the concatenated EDX:EAX registers. In one embodiment, the RDMSR microcode 128 routine loads a base register with a value specifying a global base address in the PRAM 126 for storing MSR values and the ECX value is used as an offset from the base address to form the physical PRAM 126 address. Flow ends at block 804.

FIGS. 7 and 8 describe operation of a WRMSR and RDMSR macroinstruction specifying a particular MSR, namely the IA32_SYSENTER_CS MSR, thereby advantageously potentially reducing the amount of chip area consumed by MSR storage. However, the invention is not limited to instantiating the IA32_SYSENTER_CS MSR in the PRAM 126; rather, the PRAM 126 may be employed to instantiate other MSRs that do not require immediate access by hardware of the microprocessor 100 but rather that may accommodate the latency associated with accessing the PRAM 126.

Figure 9:
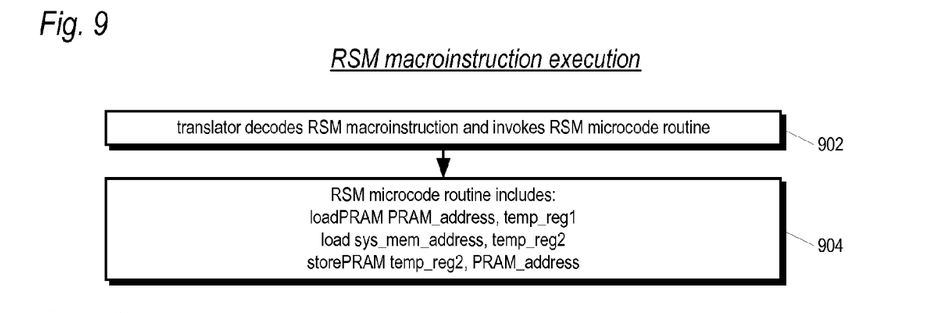
FIG. 9 is a flowchart illustrating execution by the microprocessor of FIG. 1 of an x86 architecture RSM macroinstruction according to the present invention.
Figure 10:
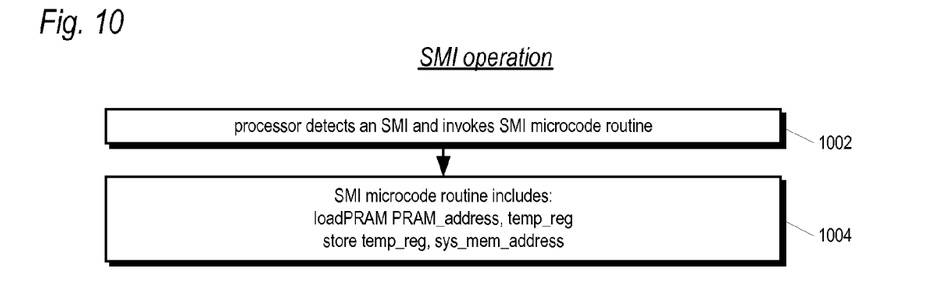
FIG. 10 is a flowchart illustrating operation of the microprocessor of FIG. 1 in response to receiving an x86 architecture SMI according to the present invention.

Before describing FIGS. 9 and 10, first a brief discussion of x86 architecture system management mode operation will be provided. The x86 macroarchitecture allocates a portion of system memory for SMI processing that is referred to as SMRAM. A portion of the SMRAM, referred to as the state save area, is used by the microprocessor 100 to save its state in response to an SMI. The base address of the SMRAM is specified by an SMBASE address value. The state save area is located at a predetermined offset from the SMBASE address. The SMBASE address value is stored in two places: within the microprocessor 100 and within a predetermined offset of the SMRAM state save area referred to as the SMBASE field. When the microprocessor 100 is reset, the SMBASE value stored within the microprocessor 100 defaults to a predetermined value defined by the macroarchitecture. When the microprocessor 100 receives an SMI, the microprocessor 100 saves the current microprocessor 100 state to the SMRAM, whose base is defined by the SMBASE value stored within the microprocessor 100. When a user program executes an x86 RSM macroinstruction, the microprocessor 100 restores the processor state from the SMRAM state save area. Restoring the processor state from the state save area includes restoring (and potentially updating) the internally stored SMBASE value with the SMBASE field value in the state save area from system memory. This feature facilitates multiprocessor operation in a multiprocessing system in which a primary processor relocates the SMRAM location for the other processors from the default location.

Referring now to FIG. 9, a flowchart illustrating execution by the microprocessor 100 of FIG. 1 of an x86 architecture RSM macroinstruction according to the present invention is shown. Flow begins at block 902.

At block 902, the instruction translator 106 decodes an RSM macroinstruction and transfers control to the microcode 128 routine associated with the RSM instruction. Flow proceeds to block 904.

At block 904, the RSM microcode 128 routine executes, which includes a loadPRAM PRAM_address, temp_reg1 microinstruction, followed by a load sys_mem_address, temp_reg2 microinstruction, followed by a storePRAM temp_reg2, PRAM_address microinstruction. The loadPRAM PRAM_address, temp_reg1 microinstruction reads the internal SMBASE value stored in a location of the PRAM 126 allocated for storing the internal SMBASE value and writes it to a first temporary register of the non-user-accessible register set 134. The load sys_mem_address, temp_reg2 microinstruction reads the SMBASE field value from system memory and writes it to a second temporary register of the non-user-accessible register set 134. Since the first temporary register now holds (by virtue of the loadPRAM PRAM_address, temp_reg1 microinstruction) the base system memory address of the SMRAM, the load sys_mem_address, temp_reg2 microinstruction specifies the SMRAM state save area SMBASE field location in system memory as a predetermined offset from the base memory address stored in the first temporary register. The storePRAM temp_reg2, PRAM_address microinstruction reads the data from the second temporary register and writes it to the location in the PRAM 126 allocated for internally storing the SMBASE value. It is noted that, in addition to restoring (and potentially updating) the internal representation of the SMBASE value, the RSM microcode 128 routine may also employ the SMBASE address stored in the first temporary register, via a series of system memory load microinstructions, to read the remainder of the microprocessor 100 state from the SMRAM state save area to restore the microprocessor 100 state. The restoring of the microprocessor 100 state may also involve additional storePRAM microinstructions to store into the PRAM 126 other state allocated for storage therein. Flow ends at block 904.

Referring now to FIG. 10, a flowchart illustrating operation of the microprocessor 100 of FIG. 1 in response to receiving an x86 architecture SMI according to the present invention is shown. Flow begins at block 1002.

At block 1002, the microprocessor 100 receives an SMI and transfers control to the microcode 128 routine associated with the SMI exception. Flow proceeds to block 1004.

At block 1004, the SMI exception handler microcode 128 routine executes, which includes a loadPRAM PRAM_address, temp_reg microinstruction followed by a store temp_reg, sys_mem_address microinstruction. The loadPRAM PRAM_address, temp_reg microinstruction reads the internal SMBASE value stored in a location of the PRAM 126 allocated for storing the internal SMBASE value and writes it to a temporary register of the non-user-accessible register set 134. The store temp_reg, sys_mem_address microinstruction reads the SMBASE value from the temporary register and writes it to the SMBASE field in the SMRAM state save area in system memory. The system memory address to which the SMBASE field value is written is specified in the store temp_reg, sys_mem_address microinstruction as a predetermined offset from the base memory address specified in the temporary register. It is noted that, in addition to saving the internal representation of the SMBASE value to the SMBASE field of the SMRAM save state area, the SMI microcode 128 routine may also employ the SMBASE address in the temporary register, via a series of system memory store microinstructions, to write the remainder of the microprocessor 100 state to the SMRAM save state area to save the microprocessor 100 state. The saving of the microprocessor 100 state may also involve additional loadPRAM microinstructions to load from the PRAM 126 other state allocated for storage therein. Flow ends at block 1004.

Although the present invention and its objects, features, and advantages have been described in detail, other embodiments are encompassed by the invention. For example, although embodiments have been described in which the PRAM 126 stores VMX VMCSs, other embodiments of the invention are contemplated in which the PRAM 126 is used to store other virtual machine architecture data structures employed by hypervisors, and is not limited to the VMX virtualization paradigm. Furthermore, although embodiments of the invention have been described with reference to the x86 macroarchitecture, the invention is not limited thereto, but may be employed in other macroarchitectures as well.

Figure 11:
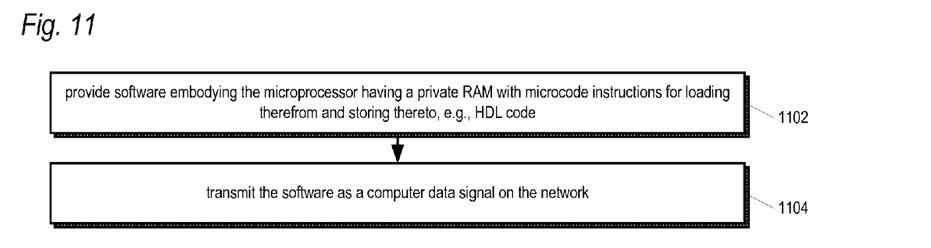
FIG. 11 is a flowchart illustrating a method of providing a microprocessor described herein by providing software describing the design of the microprocessor and subsequently transmitting the software as a computer data signal over a communication network.

While various embodiments of the present invention have been described above, it should be understood that they have been presented by way of example, and not limitation. It will be apparent to persons skilled in the relevant computer arts that various changes in form and detail can be made therein without departing from the scope of the invention. For example, in addition to using hardware (e.g., within or coupled to a Central Processing Unit ("CPU"), microprocessor, microcontroller, digital signal processor, processor core, System on Chip ("SOC"), or any other device), implementations may also be embodied in software (e.g., computer readable code, program code, and instructions disposed in any form, such as source, object or machine language) disposed, for example, in a computer usable (e.g., readable) medium configured to store the software. Such software can enable, for example, the function, fabrication, modeling, simulation, description and/or testing of the apparatus and methods described herein. For example, this can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). The software can also be disposed as a computer data signal embodied in a computer usable (e.g., readable) transmission medium (e.g., carrier wave or any other medium including digital, optical, or analog-based medium). Embodiments of the present invention may include methods of providing a microprocessor described herein by providing software describing the design of the microprocessor and subsequently transmitting the software as a computer data signal over a communication network including the Internet and intranets, such as shown in FIG. 11. It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A microprocessor, comprising:
a user-accessible register set;
a random access memory (RAM), within a non-user-accessible address space of the microprocessor, wherein said RAM is denser than said user-accessible register set and is slower to access than said user-accessible register set; and
microcode, comprising a plurality of microinstructions of a microinstruction set of the microprocessor, said microinstruction set comprising:
a first microinstruction, executable for storing data from said user-accessible register set to said RAM; and
a second microinstruction, executable for loading data from said RAM to said user-accessible register set.

2. The microprocessor as recited in claim 1, wherein said user-accessible register set comprises an x86 architecture user-accessible register set.

3. The microprocessor as recited in claim 1, further comprising:
a non-user-accessible register set, wherein said non-user-accessible register set is less dense than said RAM and is faster to access than said RAM;
wherein said first microinstruction is further executable for storing data from said non-user-accessible register set to said RAM, and said second microinstruction is further executable for loading data from said RAM to said non-user-accessible register set.

4. The microprocessor as recited in claim 3, wherein said microcode is configured to execute one or more of said first microinstruction to store a portion of an x86 architecture virtual-machine extensions (VMX) virtual machine control structure (VMCS) to said RAM in response to a VMX VMWRITE instruction.

5. The microprocessor as recited in claim 3, wherein said microcode is configured to execute one or more of said second microinstruction to load a portion of an x86 architecture virtual-machine extensions (VMX) virtual machine control structure (VMCS) from said RAM in response to a VMX VMREAD instruction.

6. The microprocessor as recited in claim 3, wherein said microcode is configured to execute one or more of said first microinstruction to store a system management mode base address (SMBASE) to said RAM in response to an x86 architecture RSM instruction.

7. The microprocessor as recited in claim 3, wherein said microcode is configured to execute one or more of said second microinstruction to load a system management mode base address (SMBASE) from said RAM in response to an x86 architecture system management interrupt (SMI).

8. The microprocessor as recited in claim 1, wherein said microcode is configured to execute one or more of said first microinstruction to store a segment selector for a privilege level 0 code segment value to said RAM in response to an x86 architecture WRMSR instruction specifying an x86 architecture IA32_SYSENTER_CS Model Specific Register (MSR) as a destination MSR.

9. The microprocessor as recited in claim 1, wherein said microcode is configured to execute one or more of said second microinstruction to load a segment selector for a privilege level 0 code segment value from said RAM in response to an x86 architecture RDMSR instruction specifying an x86 architecture IA32_SYSENTER_CS Model Specific Register (MSR) as a source MSR.

10. The microprocessor as recited in claim 1, wherein said microcode is configured to execute said first and second microinstructions to use said RAM as a temporary storage area for computations performed by said microcode.

11. The microprocessor as recited in claim 1, wherein said non-user-accessible address space is a non-translated address space.

12. The microprocessor as recited in claim 1, wherein said non-user-accessible address space is a non-cached address space.

13. The microprocessor as recited in claim 1, wherein the microprocessor generates no accesses on a bus external to the microprocessor in response to accesses by said microcode instructions to said non-user-accessible address space.

14. The microprocessor as recited in claim 1, wherein said RAM is integrated onto a same semiconductor substrate as other circuits of the microprocessor.

15. The microprocessor as recited in claim 1, wherein said RAM requires at least twice as much time to access as said user-accessible register set.

16. The microprocessor as recited in claim 1, wherein said RAM is at least twice as dense as said user-accessible register set.

17. A method for efficiently storing data within a microprocessor, the method comprising:
   executing a first microcode instruction, by storing data from a user-accessible register set of the microprocessor to a random access memory (RAM) of the microprocessor, wherein said RAM is within a non-user-accessible address space of the microprocessor, wherein said RAM is denser than said user-accessible register set and is slower to access than said user-accessible register set; and
   executing a second microcode instruction, by loading data from said RAM to said user-accessible register set, wherein said first and second microinstructions are two of a plurality of microinstructions of a microinstruction set of the microprocessor.

18. The method as recited in claim 17, wherein said user-accessible register set comprises an x86 architecture user-accessible register set.

19. The method as recited in claim 17, further comprising:
   executing said first microinstruction, by storing data from a non-user-accessible register set to said RAM, wherein said non-user-accessible register set is less dense than said RAM and is faster to access than said RAM; and
   executing said second microinstruction, by loading data from said RAM to said non-user-accessible register set.

20. The method as recited in claim 19, further comprising:
   decoding an x86 architecture virtual-machine extensions (VMX) VMWRITE instruction; and
   executing one or more of said first microinstruction to store a portion of a VMX virtual machine control structure (VMCS) to said RAM, in response to said decoding.

21. The method as recited in claim 19, further comprising:
   decoding an x86 architecture virtual-machine extensions (VMX) VMX VMREAD instruction; and
   executing one or more of said second microinstruction to load a portion of a VMX virtual machine control structure (VMCS) from said RAM, in response to said decoding.

22. The method as recited in claim 19, further comprising:
   decoding an x86 architecture RSM instruction; and
   executing one or more of said first microinstruction to store a system management mode base address (SMBASE) to said RAM, in response to said decoding.

23. The method as recited in claim 19, further comprising:
   receiving an x86 architecture system management interrupt (SMI); and
   executing one or more of said second microinstruction to load a system management mode base address (SMBASE) from said RAM, in response to said receiving.

24. The method as recited in claim 17, further comprising:
   decoding an x86 architecture WRMSR instruction specifying an x86 architecture IA32_SYSENTER_CS Model Specific Register (MSR) as a destination MSR; and
   executing one or more of said first microinstruction to store a segment selector for a privilege level 0 code segment value to said RAM, in response to said decoding.

25. The method as recited in claim 17, further comprising:
   decoding an x86 architecture RDMSR instruction specifying an x86 architecture IA32_SYSENTER_CS Model Specific Register (MSR) as a source MSR; and
   executing one or more of said second microinstruction to load a segment selector for a privilege level 0 code segment value from said RAM, in response to said decoding.

26. The method as recited in claim 17, further comprising:
   executing said first and second microinstructions to use said RAM as a temporary storage area for microcode computations.

27. A computer program product for use with a computing device, the computer program product comprising:
   a computer usable storage medium, having computer readable program code embodied in said medium, for providing a microprocessor, said computer readable program code comprising:
      first program code for providing a user-accessible register set;
      second program code for providing a random access memory (RAM),
         within a non-user-accessible address space of the microprocessor,
         wherein said RAM is denser than said user-accessible register set and is slower to access than said user-accessible register set; and
      third program code for providing microcode, comprising a plurality of microinstructions of a microinstruction set of the microprocessor,
         said microinstruction set comprising:
         a first microinstruction, executable for storing data from said user-accessible register set to said RAM; and
         a second microinstruction, executable for loading data from said RAM to said user-accessible register set.

28. The computer program product as recited in claim 27, said computer readable program code further comprising:
   fourth program code for providing a non-user-accessible register set, wherein said non-user-accessible register set is less dense than said RAM and is faster to access than said RAM;
   wherein said first microinstruction is further executable for storing data from said non-user-accessible register set to said RAM, and said second microinstruction is further executable for loading data from said RAM to said non-user-accessible register set.

29. The computer program product as recited in claim 28, wherein said microcode is configured to execute one or more of said first microinstruction to store a portion of an x86 architecture virtual-machine extensions (VMX) virtual machine control structure (VMCS) to said RAM in response to a VMX VMWRITE instruction.

* * * * *